United States Patent [19]

Liston

[11] Patent Number: 5,020,957

[45] Date of Patent: Jun. 4, 1991

[54] MAST TO BASE CONNECTION FOR A STORAGE AND RETRIEVAL MACHINE

[75] Inventor: Sergay D. Liston, Centerville, Utah

[73] Assignee: Eaton-Kenway, Inc., Salt Lake City, Utah

[21] Appl. No.: 454,340

[22] Filed: Dec. 21, 1989

[51] Int. Cl.[5] .......................... B65G 1/00; B66C 23/06

[52] U.S. Cl. .................................. 414/279; 29/400.10; 52/116; 187/9 R; 182/152; 212/266

[58] Field of Search ........................ 403/233, 364, 382; 212/175-177, 182, 183-187, 199, 202, 255, 266; 414/266, 279, 281, 277; 187/9 R, 9 E; 182/152; 52/646, 116, 111, 645, 637

[56] References Cited

U.S. PATENT DOCUMENTS

| | | | |
|---|---|---|---|
| 1,380,591 | 6/1921 | Quct | 212/176 |
| 2,068,554 | 1/1937 | Ljungkill | 52/116 |
| 2,233,901 | 3/1941 | Scacchetti | 52/721 |
| 2,378,254 | 6/1945 | Swaney | 212/183 |
| 2,429,009 | 10/1947 | Woodslayer et al. | 52/116 |
| 2,456,745 | 12/1948 | Slater | 52/116 |
| 3,483,933 | 12/1969 | Dyer et al. | 52/116 |
| 3,682,271 | 8/1972 | Boyd | 182/152 |
| 4,068,827 | 1/1978 | Fanning et al. | 212/182 |

FOREIGN PATENT DOCUMENTS

| | | | |
|---|---|---|---|
| 3302516 | 7/1984 | Fed. Rep. of Germany | 212/266 |
| 332663 | 12/1935 | Italy | 52/116 |

*Primary Examiner*—Joseph F. Peters, Jr.
*Assistant Examiner*—R. B. Johnson
*Attorney, Agent, or Firm*—F. M. Sajovec

[57] ABSTRACT

A mast to base connection for a storage and retrieval machine which incorporates a pin connection between the mast and the base. The base of the machine is formed as a plurality of elongated plates standing on edge with upwardly extending lugs formed integrally with the plates. The mast has similar lugs formed at its lower end which interleave with the lugs on the base. The mast and base are factory prealigned prior to shipment and line bored to receive connecting pins which can be precisely matched to each bore. The invention includes a method by which the mast is assembled to the base at a job site by laying the mast down on the base and inserting one of the connecting pins into the lugs, and then tilting the mast about the pin until the remaining lugs are aligned for insertion of a second pin.

4 Claims, 3 Drawing Sheets

MAST TO BASE CONNECTION FOR A STORAGE AND RETRIEVAL MACHINE

The present invention relates to storage and retrieval (S/R) machines, and more particularly to an improved arrangement for connecting the mast of such a machine to its base.

The mast of an S/R machine can be ninety or more feet long. Because of .its length it is necessary to attach the mast to the machine base at the job site. At the same time it is critical that the mast be properly aligned in order for the machine to function properly in relation to the storage rack structures with which it interfaces, and to properly distribute the load applied by the mast to the machine base so as to avoid stress concentrations.

Prior art methods for erecting and aligning a mast include bolting the mast to the base and aligning it by a trial and error process involving the placement of shims between the mast and the base; and supporting the mast on a single pivot bar, and bolting the mast in place after proper alignment has been attained by pivoting the mast about the bar.

The present invention provides a mast to base connection for an S/R machine which includes a pin connection between the mast and the base. The base of the machine is formed as a plurality of elongated plates standing on edge, with sets of lugs formed in the plates which protrude upward for connection to the mast. The mast is formed with similar lugs formed at its lower end which interleave with the lugs on the base. The lugs are precisely aligned at the factory and match line-bored to receive precisely sized pins which can be custom-fitted to the bores. Each pin is marked to identify it with a particular bore, so that when the machine is erected at a job site the lugs are lined up and a dedicated pin is inserted to complete the assembly. This construction greatly simplifies field erection of the S/R machine and insures that the load imposed on the mast will be properly distributed among the lugs to avoid stress concentrations.

Other objects and advantages of the invention will be apparent from the following description when considered in connection with the accompanying drawings, wherein.

Figure 1:
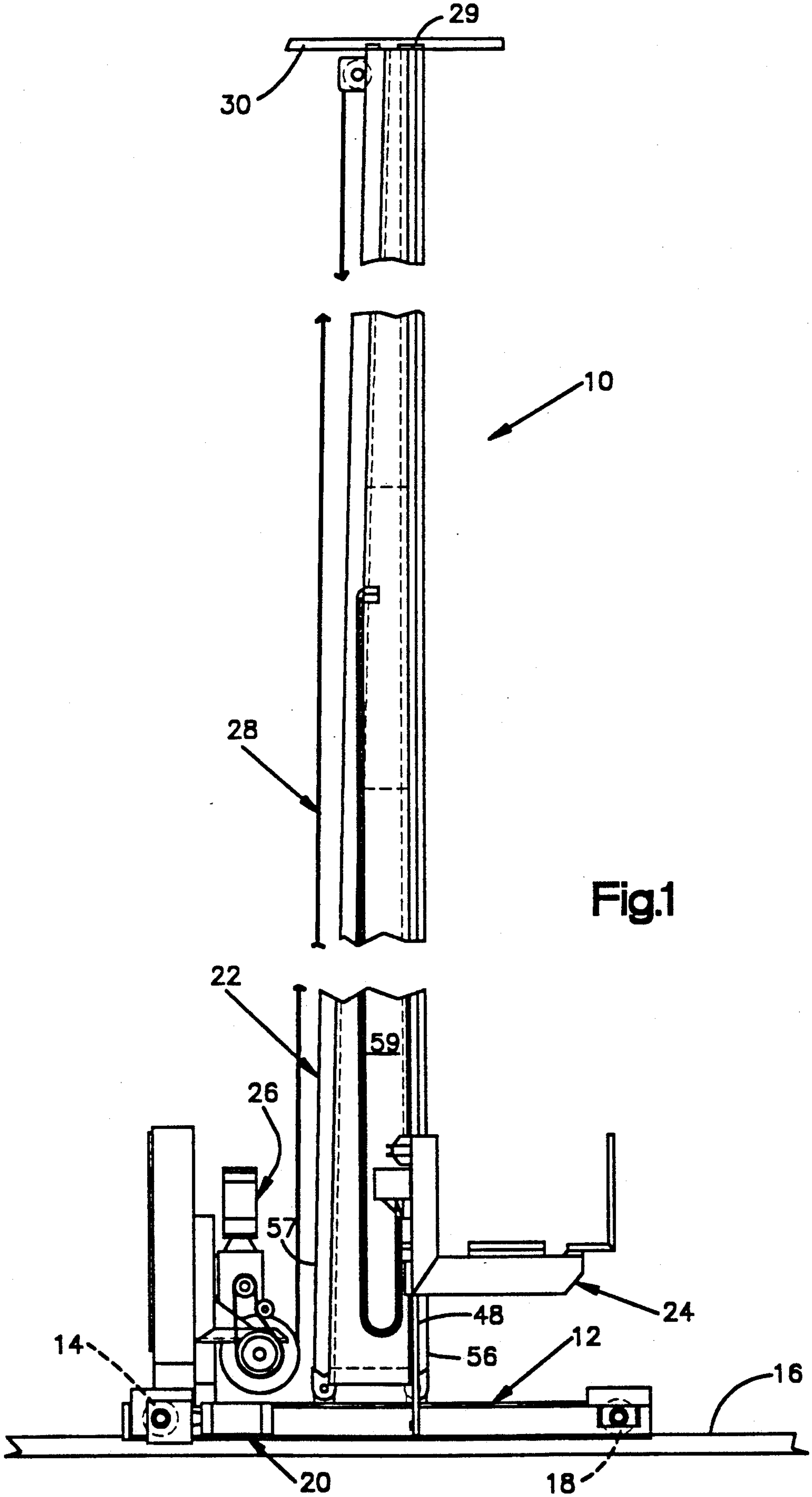
FIG. 1 is a side elevation view of a storage and retrieval (S/R) machine incorporating the invention.

Referring to FIG. 1 there is illustrated an S/R machine 10 comprising a base frame 12, a drive wheel 14 mounted for rotation on the frame 12 and engageable with a floor supported rail 16, an idler wheel 18 mounted for rotation on the frame and engageable with the rail 16, a drive motor assembly 20 mounted on the frame and operatively connected to the drive wheel to drive the S/R machine along the rail, a mast assembly 22 mounted to the frame, a load carriage assembly 24 mounted to the mast assembly for vertical movement, and a vertical drive assembly 26 mounted on the frame and operable to drive the load carriage up and down the mast by means of a cable system 28. The vehicle is stabilized by means of horizontal guide wheels 29 which engage an overhead rail 30.

Figure 2:
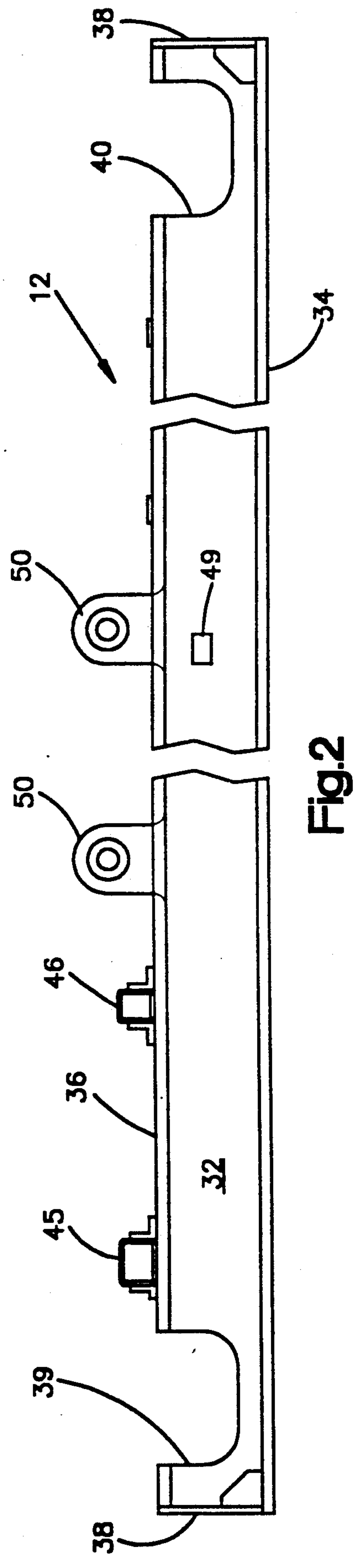
FIG. 2 is a side elevation view of the base frame assembly of the S/R machine.
Figure 3:
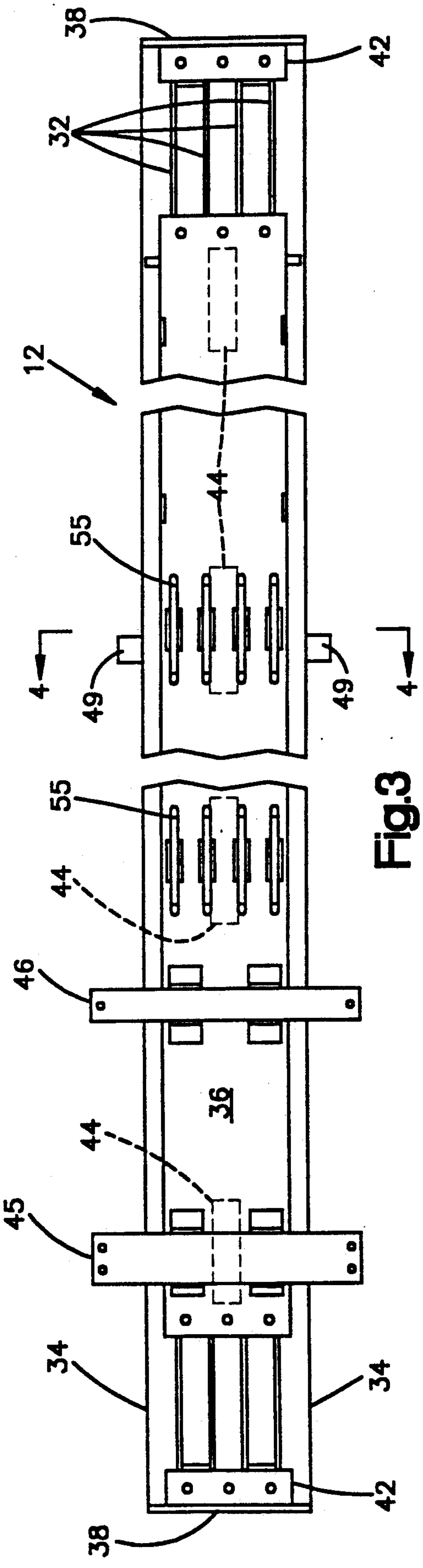
FIG. 3 is a plan view of the base frame assembly.
Figure 4:
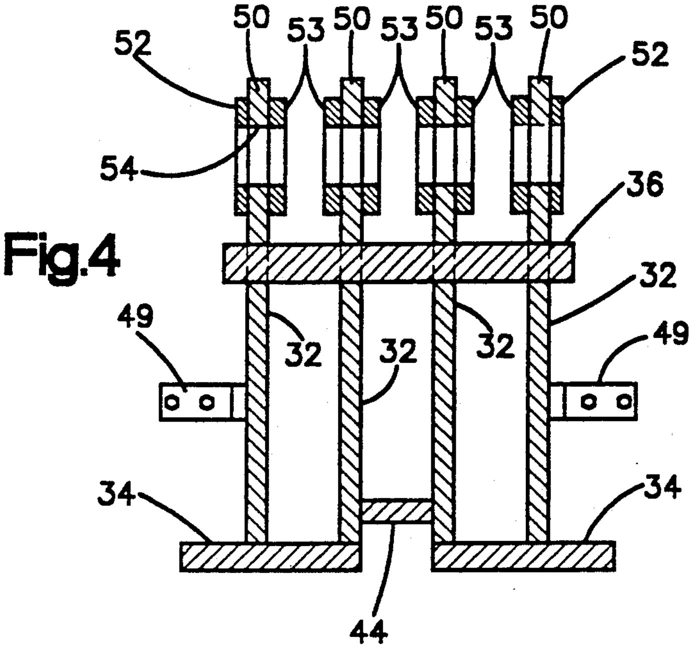
FIG. 4 is a section view taken along line 4—4 in FIG. 3.

Referring to FIGS. 2, 3 and 4, the base frame 12 comprises a plurality of elongated, upstanding plates 32 arranged along the longitudinal axis of the vehicle, a pair of elongated base plates 34 spaced apart across the longitudinal centerline and to which the plates 32 are welded, and a top plate 36 also welded to the plates 32. End plates 38 welded to the plates 32 and 34 complete the base assembly 12 in the form of a rigid box structure. Portions 39 and 40 are cut out of the box structure adjacent either end of the base for installation of the drive and idler wheel modules, and auxiliary top plates 42 are provided between these openings and the end plates. The area between the base plates 34 is open to accommodate the drive and idler wheels, and a plurality of short stiffening plates 44 are welded to the center plates at strategic points in this area of the structure. Transverse bracket assemblies 45 and 46 are attached to the top plate for installation of the drive assembly 26. Referring to FIG. 1, the load carriage 24 rides on vertical rails 48 attached to opposite sides of the mast and also to the base assembly by means of brackets 49 welded to the outermost plates 32.

In accordance with the invention, the mast assembly 22 is pivotally mounted to the base assembly 12 by means of lugs 50 which are integrally formed on the upstanding plates 32. Referring to FIGS. 2, 3 and 4, each of the plates 32 has two lugs 50 integrally formed thereon spaced apart along the longitudinal axis of the frame. Circular bearing pads 52 are welded to the outside face of the outer lugs 50, and somewhat thicker pads 53 are welded to the remaining faces of the lugs 50. A bore 54 is drilled through the lugs and pads as will be described below. As shown in FIG. 3, the lugs extend upward through slots 55 formed in the top plate 36.

Figure 6:
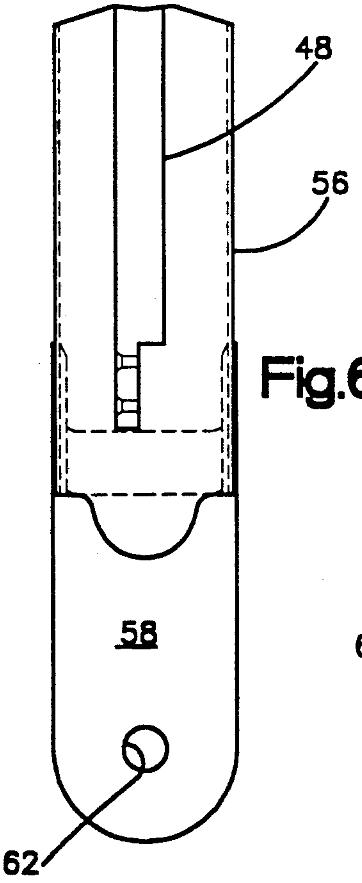
FIG. 6 is a side elevation view of a portion of the mast structure.
Figure 5:
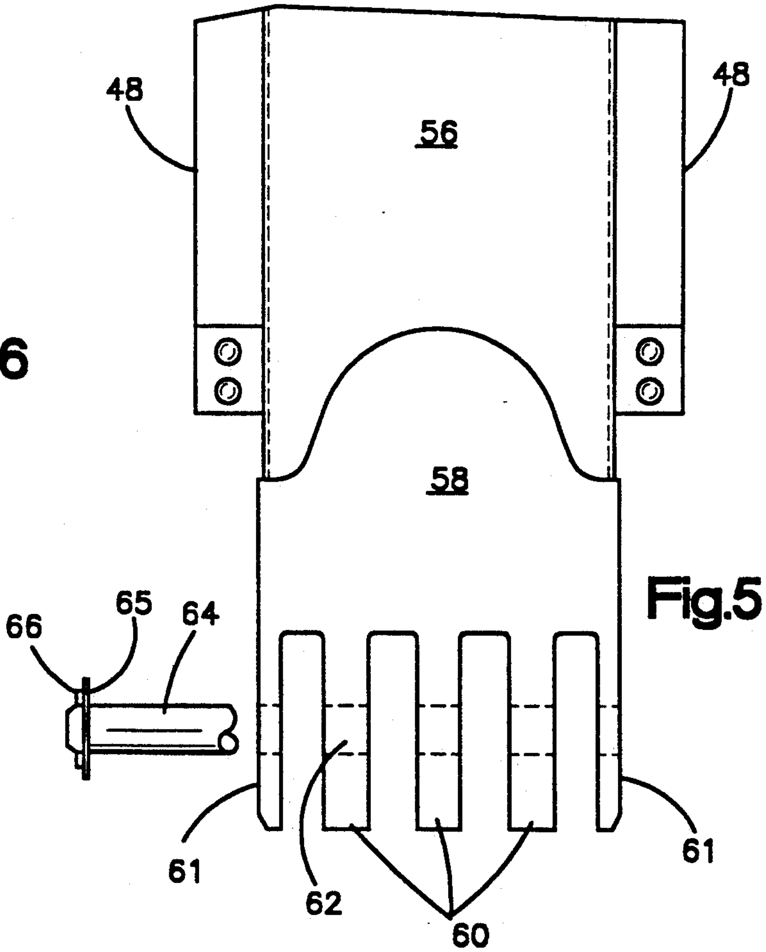
FIG. 5 is a front elevation view of a portion of the mast structure of the S/R machine.

Referring to FIGS. 1, 5 and 6, the mast assembly 22 is made up of a first elongated box section member 56, a second elongated box section member 57 which is angled toward the first as shown in FIG. 1, and a pair of side plates 59 welded to the box sections to form the tapered mast structure illustrated. As illustrated in FIGS. 5 and 6 a cast base member 58 is welded to the lower end of each of the box sections 56 and 57, each casting having three central lugs 60 which interfit with the lugs 50 of the frame assembly, and two outer lugs 61 which fit over the outer ends of the outer lugs 50. A bore 62 is drilled through the lugs 60 and 61 as will be described below.

In accordance with the invention the mast and base assembly are preassembled and precisely fit together prior to shipment. To accomplish this the bores 54 and 62 are initially drilled undersize as pilot holes, and preferably with the mast and bore assemblies lying on their sides, the lugs 60 and 61 of the mast are interfitted with the lugs 50 of the base and the bores initially aligned by inserting a pilot bar through the pilot bores. The mast and bore assembly is then held in a fixture while the bores 54 and 62 are line-bored to final size to receive a Precisely sized pin 64. Since when finally assembled on site this is a static connection, the fit between the pin and the bores can be nearly line-to-line. In accordance with a preferred method, one of the mast to base connections is line bored and the pin inserted to maintain the alignment of the assembly, after which the second hole is bored, however, it can be appreciated that with appropriate tooling both holes can be bored at the same time, or the holding fixture can be relied on to maintain alignment after the first hole is bored.

Certain other options are also available. For example, if any difficulty is experienced in the line boring operation such that precision alignment is not obtained with the initial line boring operation, the holes can be bored oversized, and a pin sized specifically for that hole diameter can be fabricated. Since the vehicle 10 is not a mass produced item such custom fitting is workable in that a custom made pin can be marked for matching with a particular set of lugs. At final assembly on site; the pin 64 is retained in the assembly by any convenient means such as by a washer 65 and pin 66 at each end.

The present invention makes it possible to greatly simplify the field erection and alignment of the mast assembly 22 to the base assembly 12, with several options being available. In accordance with one option, the base assembly 12 can be installed on the rail 16 and the mast assembly 28 lowered onto the frame by means of an overhead crane, whereupon the lugs are aligned and the pins 64 inserted. In accordance with a preferred option, the mast assembly is laid down on the base, one set of lugs is aligned and a pin 64 inserted, after which the mast assembly is pivoted about the first pin until the mast is erect and the second set of lugs is aligned for insertion of the second pin.

I claim:

1. In a storage/retrieval machine comprising a base assembly; drive means mounted on said base assembly for supporting said machine on a floor-mounted horizontal rail and for driving said machine along said rail; and a mast assembly attached to said base assembly, means mounted on said mast for storing and retrieving loads, said mast assembly and said base assembly including pin connection means for attaching the mast assembly to the base assembly; the improvement wherein said base assembly comprises a plurality of upstanding plates extending substantially the full length of said storage/retrieval machine, and a top plate welded to said plurality of upstanding plates, a plurality of longitudinally aligned apertures formed in said top plate, each of said upstanding plates having a pair of upstanding first lugs formed integrally therewith and spaced apart along the longitudinal axis of the upstanding plate and extending through said apertures in said top plate; said mast assembly comprises first and second mast elements each having a plurality of second lugs thereon interfitting with said first lugs; and said pin connection means comprises pin means received in said interfitting lugs.

2. Apparatus as claimed in claim 1 in which each of said first lugs has bearing pads attached to both sides thereof, said second lugs contacting said bearing pads when said first and second lugs are interfitted.

3. Apparatus as claimed in claim 1 in which said mast assembly comprises a first elongated box section member, a second elongated box section member, and one or more plate members attached to and interconnecting said first and second box section members.

4. Apparatus as claimed in claim 3, including an end member attached to each of said box section members, said second lugs being formed on said end members.

* * * * *